(12) United States Patent
Watanabe et al.

(10) Patent No.: US 12,130,634 B2
(45) Date of Patent: Oct. 29, 2024

(54) MOBILE OBJECT CONTROL DEVICE AND MOBILE OBJECT CONTROL METHOD

(71) Applicant: SONY GROUP CORPORATION, Tokyo (JP)

(72) Inventors: Ryo Watanabe, Tokyo (JP); Nozomu Ikeda, Tokyo (JP); Mikio Nakai, Tokyo (JP)

(73) Assignee: SONY GROUP CORPORATION, Tokyo (JP)

( * ) Notice: Subject to any disclaimer, the term of this patent is extended or adjusted under 35 U.S.C. 154(b) by 252 days.

(21) Appl. No.: 17/625,266

(22) PCT Filed: Jun. 12, 2020

(86) PCT No.: PCT/JP2020/023216
§ 371 (c)(1),
(2) Date: Jan. 6, 2022

(87) PCT Pub. No.: WO2021/010068
PCT Pub. Date: Jan. 21, 2021

(65) Prior Publication Data
US 2022/0253058 A1 Aug. 11, 2022

(30) Foreign Application Priority Data
Jul. 16, 2019 (JP) ................... 2019-131074

(51) Int. Cl.
*G05D 1/00* (2024.01)
(52) U.S. Cl.
CPC ........... *G05D 1/027* (2013.01); *G05D 1/0238* (2013.01); *G05D 1/0272* (2013.01); *G05D 1/0274* (2013.01)
(58) Field of Classification Search
CPC .... G05D 1/027; G05D 1/0238; G05D 1/0272; G05D 1/0274; G05D 1/0268;
(Continued)

(56) References Cited

U.S. PATENT DOCUMENTS

| 8,758,275 B2 | 6/2014 | Kourogi et al. |
| 9,008,996 B2 | 4/2015 | Kourogi et al. |

(Continued)

FOREIGN PATENT DOCUMENTS

| CN | 109696178 A | 4/2019 |
| JP | 08-043113 A | 2/1996 |

(Continued)

OTHER PUBLICATIONS

Prikhodko et al.. "Thermal Calibration of Silicon MEMS Gyroscopes". Mar. 5-8, 2012, IMAPS International Conference and Exhibition on Device Packaging, pp. 1-2. URL: https://bpb-us-e2.wpmucdn.com/faculty.sites.uci.edu/dist/e/700/files/2013/09/prikhodko-zotov-trusov-shkel-imaps-dpc2012.pdf (Year: 2012).*

(Continued)

*Primary Examiner* — Hunter B Lonsberry
*Assistant Examiner* — Henry R Hinton (57) ABSTRACT

A mobile object control device (1) includes a first detection unit (21), a second detection unit (22), and a stillness determination unit (24). On the basis of a sensor mounted on a mobile object (100) that moves autonomously, the first detection unit (21) detects a movement state of the mobile object (100). The second detection unit (22) detects at least one of cartographic information at a current location of the mobile object (100), object information present in a periphery of the mobile object (100), and operation information of a movable portion included in the mobile object (100). The stillness determination unit (24) determines whether the mobile object (100) is in a static state on the basis of the movement state detected by the first detection unit (21) and the information detected by the second detection unit (22).

10 Claims, 4 Drawing Sheets

(58) Field of Classification Search
CPC .... G05D 1/021; G05D 1/0257; G05D 1/0027; G05D 1/0055; G05D 1/0231; G05D 1/0248; G05D 1/0255; G05D 1/0278; G05D 1/0234; G01C 25/00; G01C 25/005; G01C 19/56; G01C 21/188; G01C 21/20; G01C 21/165; G01C 21/1656; G01C 21/28; B60W 2554/00; B60W 2554/80; B60W 2420/403; B60W 2520/10; B60W 2554/4023; B60W 2554/4041; B60W 2555/20; B60W 2556/50; B60W 30/143; B60W 30/18; B60W 30/18027; B60W 10/04; B60W 2420/408; G01S 17/86; G01S 17/42; G01S 5/017

See application file for complete search history.

(56) References Cited

U.S. PATENT DOCUMENTS

| | | | | |
|---|---|---|---|---|
| 10,591,931 | B1* | 3/2020 | Aggarwal | G05D 1/0274 |
| 2005/0206511 | A1* | 9/2005 | Heenan | G06V 20/56 |
| | | | | 340/602 |
| 2011/0172820 | A1* | 7/2011 | Kim | G01C 19/5776 |
| | | | | 700/254 |
| 2011/0301900 | A1* | 12/2011 | Patel | G01C 25/00 |
| | | | | 702/104 |
| 2014/0163779 | A1* | 6/2014 | Braunstein | E02F 9/2054 |
| | | | | 701/25 |
| 2015/0114082 | A1* | 4/2015 | Blanchard | G01C 25/005 |
| | | | | 73/1.77 |
| 2016/0257309 | A1* | 9/2016 | Kumar | B60W 30/18027 |
| 2019/0120627 | A1 | 4/2019 | Ohyama | |

FOREIGN PATENT DOCUMENTS

| | | |
|---|---|---|
| JP | 2016-203974 A | 12/2016 |
| JP | 2019-078560 A | 5/2019 |
| KR | 10-2010-0003575 A | 1/2010 |
| WO | 2010/001970 A1 | 1/2010 |
| WO | 2010/002152 A2 | 1/2010 |
| WO | 2016/141366 A1 | 9/2016 |

OTHER PUBLICATIONS

International Search Report and Written Opinion of PCT Application No. PCT/JP2020/023216, issued on Aug. 18, 2020, 09 pages of ISRWO.

* cited by examiner

| PROHIBITION POINT ID | LOCA-TION | POINT INFORMATION | PERIOD | PROHIBITION RANGE |
|---|---|---|---|---|
| 1 | #1 | MOVING WALK | NONE | WITHIN 3 m (FROM ENTRANCE/EXIT) |
| 2 | #2 | CONSTRUCTION SITE | 2019/5/1 TO 2019/6/1 | WITHIN RADIUS OF 10 m |
| ... | ... | ... | ... | ... |

MOBILE OBJECT CONTROL DEVICE AND MOBILE OBJECT CONTROL METHOD

CROSS REFERENCE TO RELATED APPLICATIONS

This application is a U.S. National Phase of International Patent Application No. PCT/JP2020/023216 filed on Jun. 12, 2020, which claims priority benefit of Japanese Patent Application No. JP 2019-131074 filed in the Japan Patent Office on Jul. 16, 2019. Each of the above-referenced applications is hereby incorporated herein by reference in its entirety.

FIELD

The present disclosure relates to a mobile object control device and a mobile object control method.

BACKGROUND

Conventionally, in a mobile object that moves autonomously, there has been a technology of estimating an own position on the basis of information measured by a sensor or the like mounted on the mobile object. As this method of estimating the own position, a dead reckoning method of estimating the own position on the basis of information of an internal sensor such as a gyroscope sensor has been known. Specifically, in the dead reckoning method, the own position is estimated by integration of a difference between sensor values which difference is a movement amount of the mobile object.

Incidentally, a sensor value of the gyroscope sensor that is the internal sensor may include an offset value due to a dynamic environmental change such as a temperature change. In the dead reckoning method, an error may be generated in the own position due to accumulation of this offset value. With respect to this, conventionally, a technology of determining a static state of a mobile object and correcting this offset value has been proposed (see, for example, Patent Literature 1).

CITATION LIST

Patent Literature

Patent Literature 1: WO 2010/001970

SUMMARY

Technical Problem

However, the conventional art has room for improvement in a point of determining a static state of a mobile object highly accurately. Note that a determination result of the static state is not limited to a case of being used for offset value correction processing, but is used for various kinds of control processing of the mobile object. Thus, improving accuracy of the determination of the static state is important in performance of various kinds of processing.

Thus, the present disclosure proposes a mobile object control device and a mobile object control method capable of determining a static state of a mobile object highly accurately.

Solution to Problem

A mobile object control device includes a first detection unit, a second detection unit, and a stillness determination unit. On the basis of a sensor mounted on a mobile object that moves autonomously, the first detection unit detects a movement state of the mobile object. The second detection unit detects at least one of cartographic information at a current location of the mobile object, object information present in a periphery of the mobile object, and operation information of a movable portion included in the mobile object. The stillness determination unit determines whether the mobile object is in a static state on the basis of the movement state detected by the first detection unit and the information detected by the second detection unit.

DESCRIPTION OF EMBODIMENTS

In the following, embodiments of the present disclosure will be described in detail on the basis of the drawings. Note that in each of the following embodiments, overlapped description is omitted by assignment of the same reference sign to identical parts.

In addition, in the present description and the drawings, a plurality of components having substantially the same functional configurations may be distinguished by assignment of different numbers after the same reference sign. However, in a case where it is not specifically necessary to distinguish the plurality of components having substantially the same functional configurations from each other, only the same reference sign is assigned.

<Configuration of Mobile Object According to Embodiment>

Figure 1:
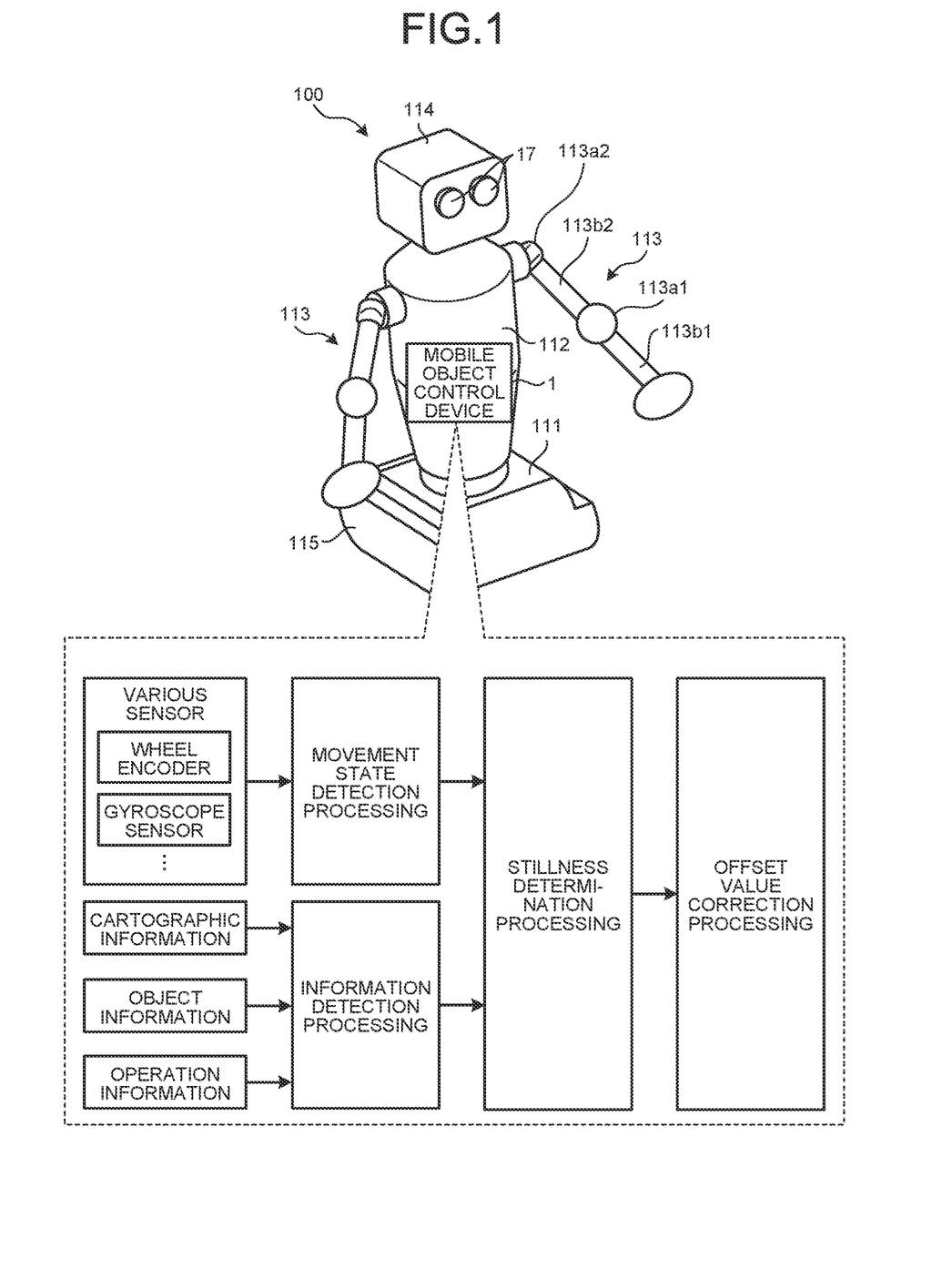
FIG. 1 is a view illustrating an outline of a mobile object control method according to an embodiment of the present disclosure.

First, an outline of a mobile object control method according to an embodiment of the present disclosure will be described with reference to FIG. 1. FIG. 1 is a view illustrating an outline of the mobile object control method according to the embodiment of the present disclosure. In FIG. 1, a robot that autonomously travels on the ground with wheels is illustrated as an example of a mobile object 100. Note that the mobile object 100 may be a robot that walks autonomously, a robot that flies autonomously (such as drone), a self-driving vehicle, or the like. Furthermore, the mobile object 100 may be, for example, a device such as a conveyance robot that conveys a package or the like, one of various industrial robots, a robotic pet used at home, or a toy.

Also, a two-arm mobile object 100 imitating a human shape is illustrated in FIG. 1. Specifically, as illustrated in FIG. 1, the mobile object 100 includes a base portion 111, a body portion 112, arms 113, and a head portion 114. The base portion 111 is a base and includes a moving mechanism 115 that moves the mobile object 100. The moving mechanism 115 is a means to move the mobile object 100, and includes wheels, legs, or the like. The body portion 112 is movably supported on the base portion 111. The arms 113 are extended from the body portion 112 and are provided movably. The head portion 114 is movably provided in an upper portion of the body portion 112.

For example, cameras 17 that image the front of the mobile object 100 are provided at positions corresponding to human eyes in the head portion 114. Note that the cameras 17 may be provided at a position to image the rear or sides of the mobile object 100. Also, the cameras 17 may be provided on the base portion 111, the body portion 112, the arms 113, or the like in addition to the head portion 114.

A plurality of the arms 113 is provided in the body portion 112. The number of arms 113 is arbitrary and may be one, or three or more. In the example illustrated in FIG. 1, a case where the two arms 113 are symmetrically provided on two side surfaces of the body portion 112 is illustrated. Each of the arms 113 is, for example, a seven-degrees-of-freedom arm. Note that a grip portion (such as hand) or the like capable of gripping an object may be provided at a leading end of each of the arms 113.

Also, a plurality of links is rotatably coupled by joint portions in the arms 113. For example, each of the arms 113 is an articulated arm including a plurality of joint portions 113a1 and 113a2 and a plurality of links 113b1 and 113b2 coupled by the joint portion 113a1. In the example illustrated in FIG. 1, the configuration of the arms 113 is illustrated in a simplified manner in order to simplify the description. In practice, shapes, the number, and an arrangement of the joint portions 113a1 and 113a2 and the links 113b1 and 113b2, directions of rotation axes of the joint portions 113a1 and 113a2, and the like can be appropriately set in such a manner that the arms 113 have a desired degree of freedom.

For example, actuators are provided in the joint portions 113a1 and 113a2. The joint portions 113a1 and 113a2 are configured to be rotatable around predetermined rotation axes by driving of the actuators. As the driving of the actuators is controlled by the mobile object control device 1, a rotation angle of each of the joint portions 113a1 and 113a2 is controlled, and driving of the arms 113 is controlled. Thus, control of operation and positions (forms) of the arms 113 can be realized. At this time, the mobile object control device 1 can control the driving of the arms 113 by various known control methods such as force control or position control.

In the example illustrated in FIG. 1, a case where the arms 113 are caused to function as movable portions will be described, but is not a limitation. For example, the mobile object 100 may cause at least one of the body portion 112, the arms 113, and the head portion 114 to function as a movable portion. Also, the movable portion may be the right and left arms 113 of the mobile object 100, or may be one of the right and left arms 113.

In the present embodiment, the mobile object 100 further includes the mobile object control device 1. The mobile object control device 1 executes a mobile object control method. Note that the mobile object control device 1 may be a device built in the mobile object 100, or may be a server device communicably connected to the mobile object 100.

Here, a method of estimating the own position of the mobile object 100 will be described. In a case where the own position of the mobile object 100 is estimated, a dead reckoning method of estimating the own position on the basis of sensor values of internal sensors and a star reckoning method of estimating the own position on the basis of sensor values of external sensors are used roughly.

The dead reckoning method is a method of calculating movement (movement amount and moving direction) of the mobile object 100 on the basis of the sensor values of the internal sensors such as an acceleration sensor, a gyroscope sensor, and a wheel encoder, and estimating the own position by accumulating this movement. That is, the dead reckoning method is a method of estimating a relative own position of the mobile object 100. By using the dead reckoning method, the own position can be estimated highly accurately, for example, even in an environment such as the inside of a tunnel in which environment a global positioning system (GPS) signal or a global navigation satellite system (GLASS) signal cannot be received or the reception thereof becomes unstable.

The star reckoning method is an own position estimating method of directly calculating an absolute position of the mobile object 100 on the basis of sensor values of external sensors such as a GPS sensor, place recognition (image feature point map matching), laser imaging detection and ranging (Lidar), and time of flight (ToF).

Note that in a case where the dead reckoning method and the star reckoning method are compared, the dead reckoning method has a higher acquisition rate of the own position. This is because an acquisition rate of the sensor values of the internal sensors is higher than an acquisition rate of the sensor values of the external sensors.

Incidentally, a sensor value of the gyroscope sensor that is one of the internal sensors may include an offset value. This offset value may be generated by a dynamic environmental change such as a temperature change, for example.

Then, in the gyroscope sensor, in a case where the own position estimation is performed by the dead reckoning method by utilization of sensor values including this offset value, the offset value is also accumulated by integration of a difference between the sensor values. Then, there is a possibility that an error is generated in the own position due to the accumulation of the offset value.

With respect to this, conventionally, a static state of the mobile object is determined, and the offset value is reset (corrected) in a case of the static state. Specifically, in a related art, a static state is determined by utilization of other internal sensors including a gyroscope sensor, and the offset value is reset.

However, conventionally, there has been room for further improvement in a point of performing the determination of a static state highly accurately. Specifically, in the related art, it is determined to be in the static state in a case where the sensor values of the internal sensors are stable at constant values. Thus, there is a possibility that accuracy of stillness determination is decreased depending on a situation of a periphery of the mobile object. For example, in the related art, the mobile object may be determined to be in the static state even in a case of being on a moving walk, an elevator, or the like. In this case, the gyroscope sensor becomes stable at a sensor value corresponding to movement of the moving walk or the like. That is, in a case where the mobile object is on the moving walk or the like, there is a possibility that the offset value is reset on the basis of an incorrect sensor value. Then, since a zero point of the gyroscope sensor is shifted when the offset value of the gyroscope sensor is reset on the basis of an incorrect standard, there is a possibility that the mobile object is erroneously determined to be in the static state although rotating at a predetermined angular velocity. Note that a determination result of the static state is not limited to a case of being used for offset value correction processing, but is used for various kinds of control processing of the mobile object. Thus, improving accuracy of the determination of the static state is important in performance of various kinds of processing.

Thus, in the mobile object control method according to the embodiment, the static state is determined in consideration of information of a periphery of the mobile object in addition to that of the internal sensors.

Specifically, as illustrated in FIG. 1, in the mobile object control method according to the embodiment, first, a movement state of the mobile object 100 is detected on the basis of various sensors (such as wheel encoder and gyroscope sensor) mounted on the mobile object 100 (movement state detection processing). More specifically, in the mobile object control method according to the embodiment, it is detected whether the mobile object 100 is in a state of moving (moving state) or in a state of being stopped (stopped state). That is, in the movement state detection processing, the stopped state is determined by utilization of the internal sensors.

Also, cartographic information, object information, and operation information are detected (information detection processing) in the mobile object control method according to the embodiment. Note that in the mobile object control method according to the embodiment, it is sufficient that at least one of the cartographic information, the object information, and the operation information can be detected.

The cartographic information is information related to a map at a current location of the mobile object 100. For example, the cartographic information includes static information. Specifically, the static cartographic information includes information related to equipment owned by a facility, such as a moving walk, a conveyor belt, and an elevator in addition to information related to a building, such as information of a landmark. Also, the cartographic information may include dynamic information. Specifically, the dynamic cartographic information includes positional information of a construction site and a vehicle (such as a truck) parked on a parking lot, and the like. That is, the cartographic information includes information of what causes a temperature change in the mobile object 100 (information of a building) and information of what moves the mobile object 100 regardless of operation of the mobile object 100 (such as shaking at a construction site).

The object information is information related to an object present around the mobile object 100. Specifically, the object information includes information related to a moving object (dynamic object) such as a person or another robot present around the mobile object 100, and a stopped object (static object) such as a wall or an ornament. Also, the object information may be information related to an object to which the mobile object 100 may apply external force, and may be information of wind (air), rain, or the like, for example.

The operation information is information related to an operation state of a movable portion included in the mobile object 100. Specifically, the operation information is information indicating whether the body portion 112, the arms 113, and the head portion 114 are in operation.

Then, in the mobile object control method according to the embodiment, it is determined whether the mobile object 100 is in a static state on the basis of the movement state detected in the movement state detection processing and the information detected in the information detection processing (stillness determination processing).

For example, in the mobile object control method according to the embodiment, in a case where it is detected by the movement state detection processing that the mobile object 100 is in the stopped state and a case where the information detected by the information detection processing satisfies a predetermined condition, it is determined that the mobile object 100 is not in the static state. Note that a case where the predetermined condition is satisfied is a case that is not to be determined as the static state, and is, for example, a case where the object information indicating that there is an object that may apply external force to the mobile object 100 is detected, a case where the cartographic information indicating that the current location of the mobile object 100 is a prohibition point (such as moving walk) (described later) is detected, or a case where the operation information indicating that the movable portion of the mobile object 100 is in operation is detected.

More specifically, in the mobile object control method according to the embodiment, it is determined that the mobile object 100 is not in the static state in a case where there is an object (such as person or robot) that may come into contact with or push the mobile object 100, a case where the mobile object 100 is on the moving walk, a case where the arms 113 of the mobile object 100 are in operation, or the like.

That is, in the mobile object control method according to the embodiment, even when the internal sensors detect that the mobile object 100 is in the stopped state, in a case where information (cartographic information, object information, or operation information) indicating that the mobile object 100 is not to be determined as the static state is detected, it is not determined that the mobile object 100 is in the static state.

Thus, even in a case where the internal sensors indicate the stopped state, it can be determined that the mobile object 100 is not in the static state in a situation in which the mobile object 100 moves due to an influence of a periphery thereof. That is, according to the mobile object control method of the embodiment, the static state of the mobile object 100 can be determined highly accurately.

Subsequently, in the mobile object control method according to the embodiment, the offset value of the gyroscope sensor is corrected on the basis of a determination result of the stillness determination processing (offset value correction processing). For example, in the mobile object control method according to the embodiment, the offset value is set to zero, that is, the offset value is reset. Alternatively, in a case where the offset value is relatively large (equal to or larger than a predetermined threshold), the offset value may be gradually decreased instead of being immediately set to zero. In other words, it can be said that the offset value correction processing is processing of correcting the zero point of the gyroscope sensor.

As described above, in the mobile object control method according to the embodiment, the offset value correction processing of the gyroscope sensor can be performed highly accurately since accuracy of the stillness determination processing can be increased.

Note that although the offset value correction processing is illustrated in FIG. 1, a determination result of the stillness determination processing may be used for another kind of control processing of the mobile object 100 instead of the offset value correction processing. Alternatively, the determination result of the stillness determination processing may be output as it is to the outside (such as another mobile object 100 or terminal device).

Figure 2:
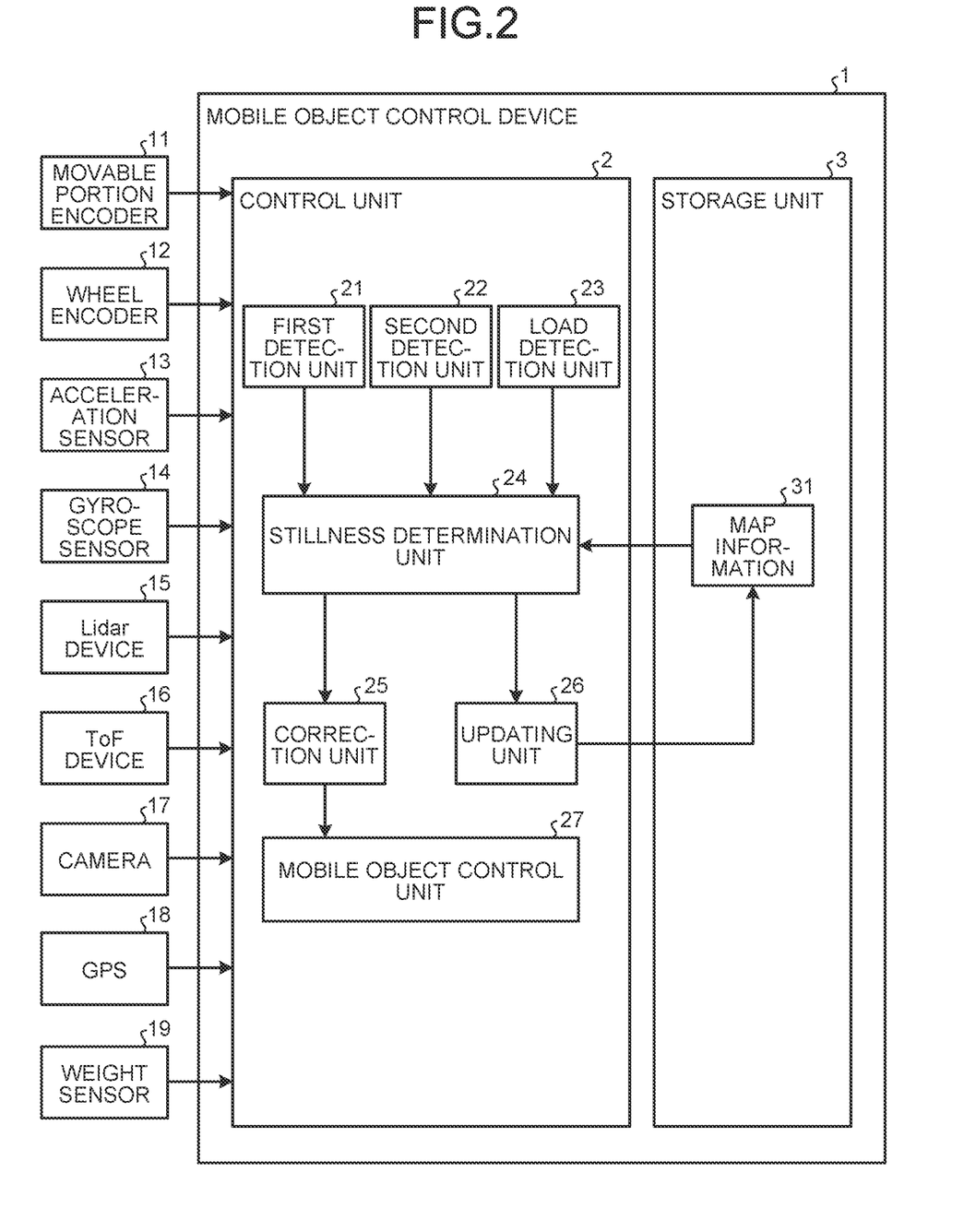
FIG. 2 is a block diagram illustrating a configuration of a mobile object control device according to the embodiment.

Next, a configuration of the mobile object control device 1 according to the embodiment will be described with reference to FIG. 2. FIG. 2 is a block diagram illustrating the configuration of the mobile object control device 1 according to the embodiment. As illustrated in FIG. 2, the mobile object control device 1 is connected to a movable portion encoder 11, a wheel encoder 12, an acceleration sensor 13, a gyroscope sensor 14, a Lidar device 15, a ToF device 16, a camera 17, a GPS 18, and a weight sensor 19.

The movable portion encoder 11 is a sensor that measures a rotation angle that is an amount of change in an angle of when movable portions (body portion 112, arms 113, and head portion 114) rotate.

The wheel encoder 12 is a sensor that measures a rotation angle that is an amount of change in an angle of when wheels in the moving mechanism 115 rotate.

The acceleration sensor 13 is a sensor that measures acceleration that is an amount of change in speed of when the mobile object 100 moves.

The gyroscope sensor 14 is a sensor that measures an angular velocity that is an amount of change in a position of the mobile object 100.

The Lidar device 15 is a ranging sensor that measures a distance by a Lidar method, and measures a distance from the mobile object 100 to an object in the periphery.

The ToF device 16 is a ranging sensor that measures a distance by a ToF method, and measures a distance from the mobile object 100 to an object in the periphery.

The camera 17 is a sensor that includes a lens system such as an RGB camera, a drive system, and an imaging element and that captures an image (still image or moving image). For example, the camera 17 can image the periphery of the mobile object 100 by being provided in a manner of being capable of imaging the outside of the mobile object 100.

The GPS 18 is a sensor that measures, by receiving a GPS signal from a GPS satellite, positional information including latitude, longitude, and altitude of the current location of the mobile object 100.

The weight sensor 19 is a sensor that measures weight of the mobile object 100, and weight of a load loaded on the mobile object 100.

In addition, the mobile object control device 1 includes a control unit 2 and a storage unit 3. The control unit 2 includes a first detection unit 21, a second detection unit 22, a load detection unit 23, a stillness determination unit 24, a correction unit 25, an updating unit 26, and a mobile object control unit 27. The storage unit 3 stores map information 31.

Here, the mobile object control device 1 includes, for example, a computer including a central processing unit (CPU), a read only memory (ROM), a random access memory (RAM), a data flash, an input/output port, and the like, and various circuits.

By reading and executing a program stored in the ROM, the CPU of the computer functions as the first detection unit 21, the second detection unit 22, the load detection unit 23, the stillness determination unit 24, the correction unit 25, the updating unit 26, and the mobile object control unit 27 of the control unit 2, for example.

Also, at least one or all of the first detection unit 21, the second detection unit 22, the load detection unit 23, the stillness determination unit 24, the correction unit 25, the updating unit 26, and the mobile object control unit 27 of the control unit 2 can be configured by hardware such as an application specific integrated circuit (ASIC) or a field programmable gate array (FPGA).

Also, the storage unit 3 corresponds to the RAM or the data flash, for example. The RAM or the data flash can store the map information 31, information of various programs, and the like. Note that the mobile object control device 1 may acquire the above-described programs and various kinds of information through another computer or a portable recording medium connected by a wired or wireless network.

The map information 31 is information related to a map. The map information 31 includes static information such as a place name, information related to a facility, and information related to equipment owned by the facility, the information related to the facility being information of a landmark or the like, and the equipment being a moving walk, a conveyor belt, an elevator, or the like. Also, the map information 31 may include dynamically changing information such as positional information of a construction site or a vehicle (such as truck) parked on a parking lot. The map information 31 may be electronic data expressed in two dimensions or three dimensions, or may be a dynamic map in which information changes dynamically.

Also, prohibition points where the stillness determination unit 24 (described later) is prohibited from determining that the mobile object 100 is in a static state are registered in the map information 31. Here, the prohibition points registered in the map information 31 will be described with reference to FIG. 3.

Figure 3:
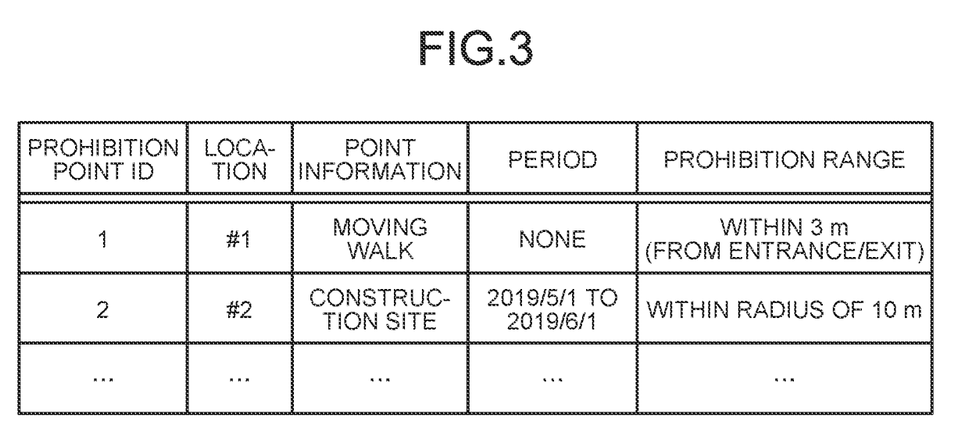
FIG. 3 is a table illustrating map information in which prohibition points are registered.

FIG. 3 is a table illustrating the map information 31 in which the prohibition points are registered. As illustrated in FIG. 3, the information of the prohibition points includes, for example, a "prohibition point ID", a "location", "point information", a "period", a "prohibition range", and the like.

The "prohibition point ID" is identification information for identifying each prohibition point. The "location" is information indicating a location of a registered prohibition point. Note that the location is expressed by "#1" or the like in FIG. 3 for convenience, but is actually expressed by latitude, longitude, and the like. The "point information" is information related to the registered prohibition point. The "period" is information of a period of being registered as the prohibition point. The "prohibition range" is information indicating a range as the prohibition point.

In the example illustrated in FIG. 3, a prohibition point identified by a prohibition point ID "1" is a moving walk located at a location "#1", and a period of registration is "none", that is, it is indicated that the registration continues indefinitely. Also, at the prohibition point identified by the prohibition point ID "1", three meters from each of an entrance and an exit of the moving walk are set as a prohibition range. That is, in a case where the current location of the mobile object 100 is located within three meters from the entrance or the exit of the moving walk registered as the prohibition point ID "1", the stillness determination unit 24 (described later) prohibits determination processing of the static state.

Also, in the example illustrated in FIG. 3, a prohibition point identified by a prohibition point ID "2" is a construction site performed at a location "#2", and a period of registration, that is, a construction period is "May 1, 2019 to Jun. 1, 2019". Also, at the prohibition point identified by the prohibition point ID "2", a radius of ten meters from the construction site is set as the prohibition range.

Next, each of functional blocks (first detection unit 21, second detection unit 22, load detection unit 23, stillness determination unit 24, correction unit 25, updating unit 26, and mobile object control unit 27) of the control unit 2 will be described.

The first detection unit 21 detects a movement state of the mobile object 100 on the basis of sensors mounted on the mobile object 100. Specifically, the first detection unit 21 detects the movement state by sensor fusion in which sensor values of the plurality of internal sensors such as the wheel encoder 12, the acceleration sensor 13, and the gyroscope sensor 14 are combined.

More specifically, in a case where a state in which a scalar quantity of the sensor value of each of the wheel encoder 12, the acceleration sensor 13, and the gyroscope sensor 14 is smaller than a predetermined threshold and a variation in the sensor values is within a predetermined threshold range continues for a predetermined period or longer, the first detection unit 21 detects that the mobile object 100 is in a stopped state (state of not moving). Note that the variation in the sensor values is, for example, a standard deviation.

On the other hand, in a case where the scalar quantity of the sensor value of each of the wheel encoder 12, the acceleration sensor 13, and the gyroscope sensor 14 is equal to or larger than the predetermined threshold, or in a case where duration of the state in which the variation in the sensor values is within the predetermined threshold range is shorter than the predetermined period, the first detection unit 21 detects that the mobile object 100 is in a moving state (non-stopped state).

Then, the first detection unit 21 notifies the stillness determination unit 24 of a detection result.

The second detection unit 22 detects at least one of cartographic information at the current location of the mobile object 100, object information present around the mobile object 100, and operation information of the movable portions included in the mobile object 100.

For example, with reference to the map information 31 stored in the storage unit 3, the second detection unit 22 detects, as the cartographic information, information corresponding to the positional information acquired by the GPS 18. Specifically, the second detection unit 22 extracts information of a point corresponding to the positional information from the map information 31, and detects the extracted information as cartographic information. For example, the second detection unit 22 detects cartographic information indicating that the current location of the mobile object 100 is a prohibition point (or prohibition range illustrated in FIG. 3) or cartographic information indicating that the current location of the mobile object 100 is a point other than the prohibition point, and gives notification thereof to the stillness determination unit 24. Note that in a case of giving notification of the cartographic information indicating that the current location is the prohibition point, the second detection unit 22 also gives notification of information that is related to the prohibition point and that is illustrated in FIG. 3.

Note that the second detection unit 22 is not limited to a case of extracting the cartographic information from the map information 31, and may detect, for example, cartographic information indicating that a construction site is around the mobile object 100 on the basis of the external sensors such as the Lidar device 15, the ToF device 16, and the camera 17.

Also, the second detection unit 22 detects the object information on the basis of the external sensors such as the Lidar device 15, the ToF device 16, and the camera 17. The object information includes a type of an object (information indicating whether being a moving object or a statistic object), a type in a case of the moving object (information indicating whether being a vehicle such as a car or a person), relative positional information with respect to the mobile object 100, relative speed information, a size of the object, and the like.

Also, the second detection unit 22 detects operation information on the basis of the movable portion encoder 11. Specifically, the second detection unit 22 detects the operation information indicating whether the movable portions of the mobile object 100 are in operation or stopped.

The load detection unit 23 detects load information related to a load loaded on the mobile object 100. For example, on the basis of a sensor value of the weight sensor 19, the load detection unit 23 detects load information including information such as presence or absence of the load and weight of the load. Also, the load detection unit 23 detects load information including information such as a type of the load (such as liquid or solid) and a size of the load on the basis of an image captured by the camera 17, for example.

The stillness determination unit 24 determines whether the mobile object 100 is in a state of being stopped (static state) or a state of moving (operating state or moving state). Specifically, the stillness determination unit 24 determines the static state of the mobile object 100 on the basis of the movement state (moving state or stopped state) detected by the first detection unit 21 and the information detected by the second detection unit 22 (cartographic information, object information, and operation information).

For example, in a case where the first detection unit 21 detects the moving state, the stillness determination unit 24 determines that the mobile object 100 is not in the static state regardless of contents of the information detected by the second detection unit 22. In other words, the stillness determination unit 24 determines that the mobile object 100 is in the moving state.

Also, in a case where the first detection unit 21 detects the stopped state, the stillness determination unit 24 determines the static state of the mobile object 100 on the basis of the information detected by the second detection unit 22.

Specifically, in a case where the first detection unit 21 detects the stopped state and the second detection unit 22 detects the object information indicating that there is an object that may apply external force to the mobile object 100, the stillness determination unit 24 determines that the mobile object 100 is not in the static state.

Thus, for example, it is possible to determine that the mobile object 100 is not in the static state in a situation in which the mobile object 100 is moved even during the stop due to external force of another mobile object 100 such as a person or a robot present around the mobile object 100. Also, in a case where the mobile object 100 is a flying object such as a drone, it is possible to determine, by detecting object information such as wind, that the mobile object 100 is not in the static state in a situation in which the drone shakes due to the wind or the like even though being stopped in a floating state. That is, the static state of the mobile object 100 can be determined highly accurately.

On the other hand, in a case where the first detection unit 21 detects the stopped state and the second detection unit 22 detects the object information indicating that there is no object that may apply external force to the mobile object 100, the stillness determination unit 24 determines that the mobile object 100 is in the static state.

Also, the stillness determination unit 24 determines that the mobile object 100 is not in the static state in a case where the first detection unit 21 detects the stopped state and the second detection unit 22 detects the cartographic information indicating a point where external force may be applied to the mobile object 100 (such as prohibition point).

More specifically, the stillness determination unit 24 determines that the mobile object 100 is not in the static state in a case where the first detection unit 21 detects the stopped state and the second detection unit 22 detects, on the basis of the map information 31, the cartographic information indicating that the current location of the mobile object 100 is a prohibition point.

Thus, it is possible to determine that the mobile object 100 is not in the static state, for example, in a situation such as a case where the mobile object 100 moves on a moving walk even though being stopped or a case where the mobile object 100 vibrates due to a vibration of construction near a construction site. That is, the static state of the mobile object 100 can be determined highly accurately.

On the other hand, the stillness determination unit 24 determines that the mobile object 100 is in the static state in a case where the first detection unit 21 detects the stopped state and the second detection unit 22 detects the cartographic information indicating a point other than the point where external force may be applied to the mobile object 100.

For example, in a case where the current location of the mobile object 100 is a point where an offset value is likely to be generated, the stillness determination unit 24 determines that the mobile object 100 is in the static state. Specifically, the stillness determination unit 24 determines that the mobile object 100 is in the static state in a case where the mobile object 100 is at a point where a temperature change is likely to be generated, such as a case where entrance to a building is performed. That is, in a case where the mobile object 100 is at a point where an offset value is likely to be generated in the gyroscope sensor 14 due to a temperature change, it is determined that the mobile object 100 is in the static state, and the correction unit 25 in the subsequent stage is caused to correct the offset value. Note that the point where the offset value is likely to be generated is, for example, a point where entrance into a building can be performed, such as a door of the building. Note that such a point may be embedded in the map information 31 in advance, or the door may be detected by the camera 17.

Also, the stillness determination unit 24 determines that the mobile object 100 is not in the static state in a case where the first detection unit 21 detects the stopped state and the second detection unit 22 detects the operation information indicating that the movable portions of the mobile object 100 are in operation.

Thus, for example, it can be determined that the mobile object 100 is not in the static state in a situation in which a vibration associated with the operation of the movable portions is generated even though the mobile object 100 is stopped. That is, the static state of the mobile object 100 can be determined highly accurately.

Note that in a case where the mobile object 100 moves with two legs, the static state may be determined in consideration of operation information including information indicating whether a handrail, a wall, or the like is gripped by the movable portions. Thus, for example, even when the bipedal mobile object 100 is stopped and the movable portions are stopped, when the handrail, the wall, or the like is not gripped by the movable portions, it is determined that the mobile object 100 is not in the static state since a position is unstable and there is a possibility of shaking. In other words, only in a case where the mobile object 100 is stopped and the movable portions are stopped, and in a case of a stable state in which the handrail, the wall, or the like is gripped by the movable portions, it is determined that the mobile object 100 is in the static state.

On the other hand, the stillness determination unit 24 determines that the mobile object 100 is in the static state in a case where the first detection unit 21 detects the stopped state and the second detection unit 22 detects the operation information indicating that the movable portions of the mobile object 100 are stopped.

Note that the stillness determination unit 24 may determine the static state on the basis of at least one of the cartographic information, the object information, and the operation information, or may determine the static state on the basis of all of these three kinds of information.

That is, the stillness determination unit 24 may perform pieces of determination processing of the static state on the basis of the cartographic information, the object information, and the operation information respectively, and finally confirm the static state only in a case where it is determined in all of the three pieces of determination processing that the mobile object 100 is in the static state.

In other words, in a case where it is determined that the mobile object 100 is not in the static state in any one of the three pieces of determination processing, the stillness determination unit 24 confirms a determination result indicating that the mobile object 100 is not in the static state even when it is determined that the mobile object 100 is in the static state in the remaining two pieces of determination processing.

Note that in a case where the static state is confirmed on the basis of the above three kinds of determination processing, for example, the stillness determination unit 24 may assign weight to the determination result of each kind of the determination processing, and confirm that the mobile object 100 is in the static state in a case where a calculation result in which the weight is assigned to the three kinds of determination processing is equal to or larger than a predetermined threshold.

Note that the stillness determination unit 24 may determine the static state in consideration of the load information detected by the load detection unit 23 in addition to the above three pieces of information (cartographic information, object information, and operation information).

For example, in a case where there is a load on the mobile object 100, the stillness determination unit 24 determines that the mobile object 100 is not in the static state. Specifically, even in a case where the first detection unit 21 detects the stopped state and it is determined that the mobile object 100 is in the static state in the determination processing based on each of the three kinds of information detected by the second detection unit 22, the stillness determination unit 24 determines that the mobile object 100 is not in the static state in a case where the load is loaded.

Thus, it is possible to determine that the mobile object 100 is not in the static state in a situation such as a case where liquid that is a load shakes or a case where contents of a box that is a load move even though the mobile object 100 is stopped, for example.

In a case where the stillness determination unit 24 determines that the mobile object 100 is in the static state, the correction unit 25 corrects the offset value included in the gyroscope sensor 14. Specifically, the correction unit 25 acquires information of the offset value from the gyroscope sensor 14, and calculates a correction sensor value, which is a corrected (reset) sensor value, by subtracting the offset value from the sensor value of the gyroscope sensor 14. Then, the correction unit 25 outputs the correction sensor value to the mobile object control unit 27.

Note that the correction sensor value is calculated by the subtraction of the offset value from the sensor value. However, for example, in a case where the offset value is equal to or larger than a predetermined threshold, the correction unit 25 may calculate the correction sensor value in stages by subtracting a predetermined value (such as half value of the offset value) from the sensor value in stages (for each kind of determination processing by the stillness determination unit 24), and finally calculate the correction sensor value, that is the sensor value from which the offset value is subtracted, after a plurality of times of the determination processing. That is, the correction unit 25 may gradually correct the offset value of the sensor value.

Thus, in a case where the offset value is relatively large, it is possible to prevent a rapid change in the angular velocity of the gyroscope sensor 14 due to subtraction of the whole offset value from the sensor value at a time.

Also, correction of the offset value by the correction unit 25 may be performed in consideration of a temperature change around the mobile object 100.

For example, in a case where the stillness determination unit 24 determines that the mobile object 100 is in the static state, and there is a temperature change equal to or larger than a predetermined threshold within a predetermined time around the mobile object 100, the correction unit 25 corrects the offset value. That is, the correction unit 25 corrects the offset value in a case where there is a rapidly-decreasing temperature change (temperature rise or temperature fall) in a short time. Thus, even in a case where the offset value is generated due to the sudden temperature change and a zero point of the gyroscope sensor 14 changes suddenly, the offset value can be immediately corrected.

Note that in a case where there is the above-described sudden temperature change around the mobile object 100, there is a time difference until the temperature change is generated inside the mobile object 100, that is, at a position where the gyroscope sensor 14 is mounted. That is, even when there is the sudden temperature change around the mobile object 100, there is a time difference until the offset value is generated. Thus, the correction unit 25 may correct the offset value at timing in consideration of the time difference.

Specifically, the correction unit 25 corrects the offset value in a predetermined period after the timing of the temperature change. Note that the predetermined period may be, for example, a fixed value determined in advance by a manager of the mobile object 100, or may be variable on the basis of contents of the temperature change (time required for the change, or temperature difference before and after the change).

The updating unit 26 performs update processing of updating the map information 31 stored in the storage unit 3. Specifically, in a case where the second detection unit 22 detects that a point is other than the prohibition point and the stillness determination unit 24 determines that the mobile object 100 is not in the static state on the basis of the cartographic information, the updating unit 26 performs update processing of registering the point as the prohibition point in the map information 31.

Note that the updating unit 26 may communicate with an external server or another mobile object 100 and update the map information 31 on the basis of information acquired by the communication, for example. Thus, even in a place where the mobile object 100 passes for the first time, the stillness determination unit 24 can determine the static state highly accurately.

The mobile object control unit 27 controls autonomous movement of the mobile object 100 on the basis of various sensors. Also, the mobile object control unit 27 controls the mobile object 100 on the basis of the correction sensor value, which is the sensor value corrected by the correction unit 25, with respect to the gyroscope sensor 14.

Figure 4:
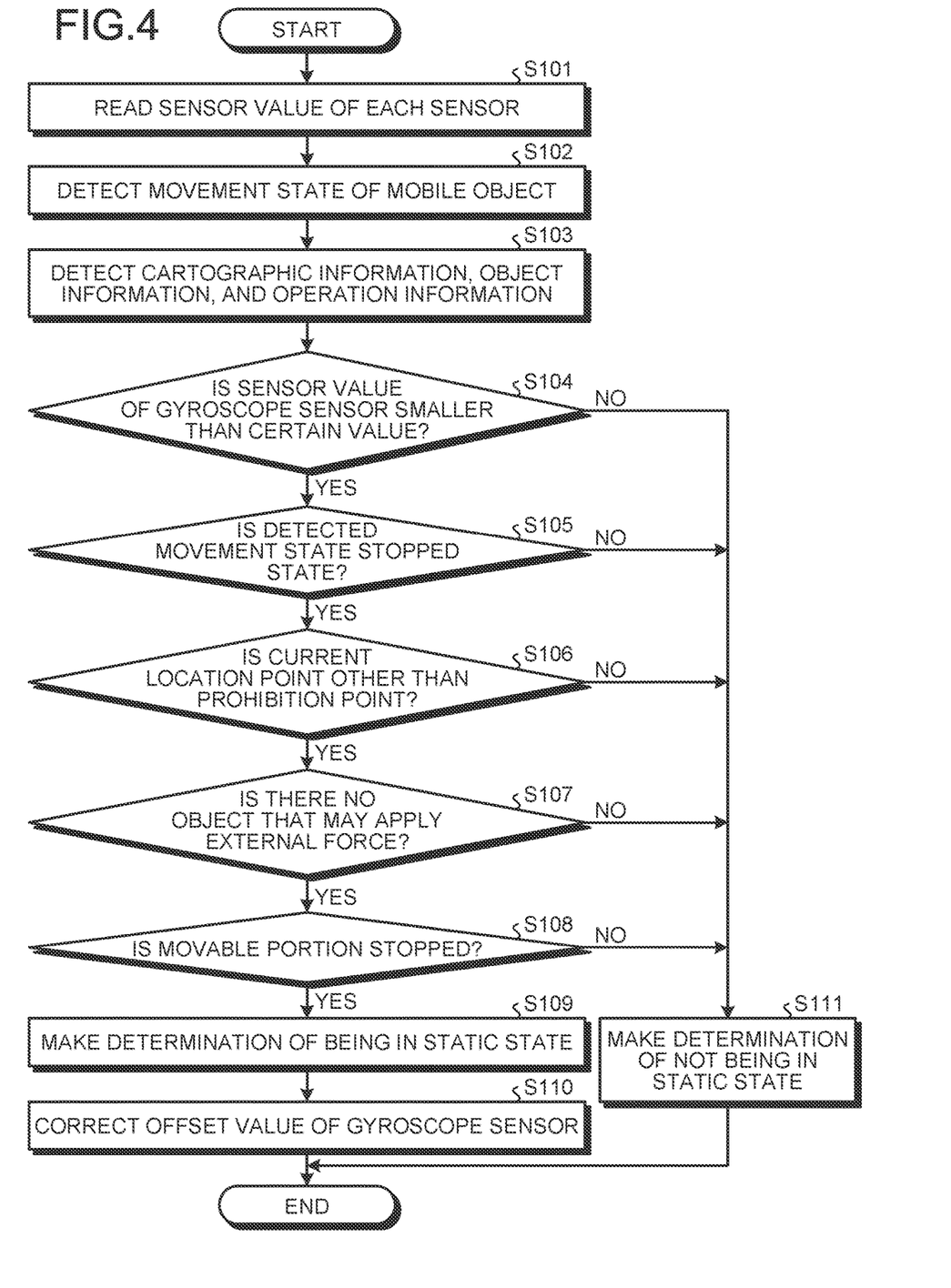
FIG. 4 is a flowchart illustrating a procedure of control processing executed by the mobile object control device according to the embodiment.

Next, a procedure of offset value correction processing executed by the mobile object control device 1 according to the embodiment will be described with reference to FIG. 4. FIG. 4 is a flowchart illustrating the procedure of the correction processing executed by the mobile object control device 1 according to the embodiment. Note that since the offset value itself does not change frequently, the following correction processing is sufficient, for example, when being performed at intervals of a several seconds.

As illustrated in FIG. 4, the control unit 2 reads a sensor value of each of the sensors (movable portion encoder 11, wheel encoder 12, acceleration sensor 13, gyroscope sensor 14, Lidar device 15, ToF device 16, camera 17, GPS 18, and weight sensor 19) (Step S101).

Subsequently, the first detection unit 21 detects a movement state of the mobile object 100 on the basis of the sensor values of the wheel encoder 12 and the acceleration sensor 13 (Step S102).

Subsequently, the second detection unit 22 detects cartographic information, object information, and operation information (Step S103).

Subsequently, the stillness determination unit 24 determines whether the sensor value of the gyroscope sensor 14 is equal to or smaller than a certain value (Step S104). Specifically, the stillness determination unit 24 determines whether a scalar quantity or a variation of the angular velocity is equal to or smaller than a predetermined threshold.

In a case of determining that the sensor value of the gyroscope sensor 14 is equal to or smaller than the certain value (Step S104: Yes), the stillness determination unit 24 determines whether the movement state detected by the first detection unit 21 is a stopped state (Step S105).

In a case where the movement state detected by the first detection unit 21 is the stopped state (Step S105: Yes), the stillness determination unit 24 determines whether a current location of the mobile object 100 is a point other than a prohibition point (Step S106).

In a case where the current location of the mobile object 100 is a point other than the prohibition point (Step S106: Yes), the stillness determination unit 24 determines whether there is an object that may apply external force around the mobile object 100 (Step S107).

In a case where there is no object that may apply external force around the mobile object 100 (Step S107: Yes), the stillness determination unit 24 determines whether the movable portions of the mobile object 100 are stopped (Step S108).

In a case where the movable portions of the mobile object 100 are stopped (Step S108: Yes), the stillness determination unit 24 determines that the mobile object 100 is in a static state (Step S109).

Subsequently, in a case where the stillness determination unit 24 determines that the mobile object 100 is in the static state, the correction unit 25 corrects the offset value of the gyroscope sensor 14 (Step S110), and ends the processing.

On the other hand, in a case of determining in Step S104 that the sensor value of the gyroscope sensor 14 is not equal to or smaller than the certain value (Step S104: No), the stillness determination unit 24 determines that the mobile object 100 is not in the static state (Step S111), and ends the processing.

Also, in a case where the movement state detected by the first detection unit 21 is not the stopped state in Step S105 (Step S105: No), the stillness determination unit 24 executes Step S111 and ends the processing.

Also, in a case where the current location of the mobile object 100 is the prohibition point in Step S106 (Step S106: No), the stillness determination unit 24 executes Step S111 and ends the processing.

Also, in a case where there is an object that may apply external force around the mobile object 100 in Step S107 (Step S107: No), the stillness determination unit 24 executes Step S111 and ends the processing.

Furthermore, in a case where the movable portions of the mobile object 100 are in operation in Step S108 (Step S108: No), the stillness determination unit 24 executes Step S111 and ends the processing.

Note that processing order of the determination processing in Step S104 to Step S108 in FIG. 4 is an example, and the processing order of Step S104 to Step S108 may be arbitrarily changed.

Also, among the pieces of processing described in the above embodiments, all or a part of the processing described to be automatically performed can be manually performed, or all or a part of the processing described to be manually performed can be automatically performed by a known method. In addition, the processing procedures, specific names, and information including various kinds of data or parameters illustrated in the above document or in the drawings can be arbitrarily changed unless otherwise specified. For example, various kinds of information illustrated in each drawing are not limited to the illustrated information.

Also, each component of each of the illustrated devices is a functional concept, and does not need to be physically configured in a manner illustrated in the drawings. That is, a specific form of distribution/integration of each device is not limited to what is illustrated in the drawings, and a whole or part thereof can be functionally or physically distributed/integrated in an arbitrary unit according to various loads and usage conditions.

In addition, the above-described embodiments can be arbitrarily combined in a region in which the processing contents do not contradict each other. Furthermore, order of steps illustrated in the flowchart and the sequence diagram of the above-described embodiments can be changed as appropriate.

<Conclusion>

As described above, according to an embodiment of the present disclosure, the mobile object control device 1 includes the first detection unit 21, the second detection unit 22, and the stillness determination unit 24. On the basis of sensors mounted on the mobile object 100 that moves autonomously, the first detection unit 21 detects a movement state of the mobile object 100. The second detection unit 22 detects at least one of cartographic information at the current location of the mobile object 100, object information present around the mobile object 100, and operation information of the movable portions included in the mobile object 100. The stillness determination unit 24 determines whether the mobile object 100 is in a static state on the basis of the movement state detected by the first detection unit 21 and the information detected by the second detection unit 22.

Thus, for example, even in a case where an internal sensor indicates a stopped state, it can be determined that the mobile object 100 is not in the static state in a situation in which the mobile object 100 moves due to an influence of the periphery of the mobile object 100, whereby it is possible to determine the static state of the mobile object 100 highly accurately.

Also, in a case where the first detection unit 21 detects that the mobile object 100 is in the stopped state and the second detection unit 22 detects the object information indicating that there is an object that may apply external force to the mobile object 100, the stillness determination unit 24 according to the embodiment determines that the mobile object 100 is not in the static state.

Thus, in a case where an object present around the mobile object 100 applies external force to the mobile object 100, it is possible to determine that the mobile object 100 is not in the static state, whereby it is possible to determine the static state highly accurately.

Also, in a case where the first detection unit 21 detects that the mobile object 100 is in the stopped state and the second detection unit 22 detects the cartographic information indicating a point where the external force may be applied to the mobile object 100, the stillness determination unit 24 according to the embodiment determines that the mobile object 100 is not in the static state.

Thus, for example, in a case where the mobile object 100 is on a moving walk or near a construction site where the ground vibrates, it is possible to determine that the mobile object 100 is not in the static state, whereby it is possible to determine the static state highly accurately.

Also, the mobile object control device 1 according to the embodiment includes the storage unit 3. The storage unit 3 stores the map information 31 in which a prohibition point where it is prohibited to determine that the mobile object 100 is in the static state is registered. In a case where the first detection unit 21 detects that the mobile object 100 is in the stopped state and the second detection unit 22 detects the cartographic information indicating that the current location of the mobile object 100 is the prohibition point on the basis of the map information 31, the stillness determination unit 24 determines that the mobile object 100 is not in the static state.

As a result, since the static state can be determined on the basis of the prohibition point registered in advance in the map information 31, the static state can be determined highly accurately with a low load.

Also, the mobile object control device 1 according to the embodiment further includes the updating unit 26. In a case where the second detection unit 22 detects the cartographic information indicating a point other than the prohibition point and the stillness determination unit 24 determines that the mobile object 100 is not in the static state on the basis of the cartographic information, the updating unit 26 performs update processing of registering the point as the prohibition point in the map information 31.

Thus, for example, in a case where there is a temporary prohibition point such as a construction site or a case where a new building is constructed, it is possible to determine the static state highly accurately by an update to new map information 31.

Also, the stillness determination unit 24 determines that the mobile object 100 is not in the static state in a case where the first detection unit 21 detects that the mobile object 100 is in the stopped state and the second detection unit 22 detects the operation information indicating that the movable portions included in the mobile object 100 are in operation.

Thus, it is possible to determine the static state highly accurately in a situation in which the mobile object 100 is detected to be in the stopped state and the movable portions included in the mobile object 100 are operated by the second detection unit 22.

Also, the mobile object control device 1 according to the embodiment further includes the correction unit 25. In a case where the stillness determination unit 24 determines that the mobile object 100 is in the static state, the correction unit 25 corrects an offset value included in the gyroscope sensor 14.

As a result, the offset value can be corrected highly accurately.

Also, the correction unit 25 corrects the offset value in a case where the stillness determination unit 24 determines that the mobile object 100 is in the static state, and there is a temperature change equal to or larger than a predetermined threshold within a predetermined time in the periphery of the mobile object 100.

As a result, the offset value generated by the temperature change can be securely corrected.

Also, the correction unit 25 corrects the offset value after a predetermined period elapses from timing of the temperature change.

As a result, in a case where the temperature change is generated in the gyroscope sensor 14 built in the mobile object 100 and the offset value is generated, the offset value can be corrected at appropriate timing.

Also, the mobile object control device 1 according to the embodiment further includes the load detection unit 23. The load detection unit 23 detects load information related to a load on the mobile object 100. When there is a load on the mobile object 100, the stillness determination unit 24 determines that the mobile object 100 is not in the static state.

Thus, it is possible to determine the static state highly accurately, for example, in a situation such as a case where liquid that is the load shakes or a case where contents of a box that is the load move even though the mobile object 100 is stopped.

Although embodiments of the present disclosure have been described above, the technical scope of the present disclosure is not limited to the above-described embodiments as they are, and various modifications can be made within the spirit and scope of the present disclosure. Also, components of different embodiments and modification examples may be arbitrarily combined.

Also, an effect in each of the embodiments described in the present description is merely an example and is not a limitation, and there may be a different effect.

Note that the present technology can also have the following configurations.

(1)

A mobile object control device comprising:

a first detection unit that detects, on a basis of a sensor mounted on a mobile object that moves autonomously, a movement state of the mobile object;

a second detection unit that detects at least one of cartographic information at a current location of the mobile object, object information present in a periphery of the mobile object, and operation information of a movable portion included in the mobile object; and a stillness determination unit that determines whether the mobile object is in a static state on a basis of the movement state detected by the first detection unit and the information detected by the second detection unit.

(2)

The mobile object control device according to claim 1, wherein the stillness determination unit determines that the mobile object is not in the static state in a case where the first detection unit detects that the mobile object is in a stopped state and the second detection unit detects the object information indicating that there is an object that may apply external force to the mobile object.

(3)

The mobile object control device according to claim 1, wherein the stillness determination unit determines that the mobile object is not in the static state in a case where the first detection unit detects that the mobile object is in a stopped state and the second detection unit detects the cartographic information indicating a point at which external force may be applied to the mobile object.

(4)

The mobile object control device according to claim 1, further comprising a storage unit that stores map information in which a prohibition point where it is prohibited to make a determination of being in the static state is registered, wherein the stillness determination unit determines that the mobile object is not in the static state in a case where the first detection unit detects that the mobile object is in a stopped state and the second detection unit detects, on a basis of the map information, the cartographic information indicating that the current location of the mobile object is the prohibition point.

(5)

The mobile object control device according to claim 4, further comprising an updating unit that performs, in a case where the second detection unit detects the cartographic information indicating a point other than the prohibition point and the stillness determination unit makes a determination of not being in the static state on a basis of the cartographic information, update processing of registering the point as the prohibition point in the map information.

(6)

The mobile object control device according to claim 1, wherein the stillness determination unit determines that the mobile object is not in the static state in a case where the first detection unit detects that the mobile object is in a stopped state and the second detection unit detects the operation information indicating that the movable portion included in the mobile object is in operation.

(7)

The mobile object control device according to claim 1, wherein the sensor includes a gyroscope sensor, the mobile object control device further comprising a correction unit that corrects an offset value included in the gyroscope sensor in a case where the stillness determination unit determines that the mobile object is in the static state.

(8)

The mobile object control device according to claim 7, wherein the correction unit corrects the offset value in a case where the stillness determination unit determines that the mobile object is in the static state and there is a temperature change equal to or larger than a predetermined threshold within a predetermined time in the periphery of the mobile object.

(9)

The mobile object control device according to claim 8, wherein the correction unit corrects the offset value after a predetermined period elapses from timing of the temperature change.

(10)

The mobile object control device according to claim 1, further comprising a load detection unit that detects load information related to a load on the mobile object, wherein the stillness determination unit determines that the mobile object is not in the static state in a case where there is the load on the mobile object.

(11)
A mobile object control method comprising:
a first detection step of detecting, on a basis of a sensor mounted on a mobile object that moves autonomously, a movement state of the mobile object;
a second detection step of detecting at least one of cartographic information at a current location of the mobile object, object information present in a periphery of the mobile object, and operation information of a movable portion included in the mobile object; and
a stillness determination step of determining whether the mobile object is in a static state on a basis of the movement state detected in the first detection step and the information detected in the second detection step.

REFERENCE SIGNS LIST

1 MOBILE OBJECT CONTROL DEVICE
2 CONTROL UNIT
3 STORAGE UNIT
11 MOVABLE PORTION ENCODER
12 WHEEL ENCODER
13 ACCELERATION SENSOR
14 GYROSCOPE SENSOR
15 LIDAR DEVICE
16 TOF DEVICE
17 CAMERA
18 GPS
19 WEIGHT SENSOR
21 FIRST DETECTION UNIT
22 SECOND DETECTION UNIT
23 LOAD DETECTION UNIT
24 STILLNESS DETERMINATION UNIT
25 CORRECTION UNIT
26 UPDATING UNIT
27 MOBILE OBJECT CONTROL UNIT
31 MAP INFORMATION
100 MOBILE OBJECT

The invention claimed is:

1. A mobile object control device, comprising:
a sensor configured to measure a plurality of sensor values associated with a mobile object, wherein
the sensor is mounted on the mobile object that moves autonomously,
a first sensor value of the plurality of sensor values includes an offset value, and
the offset value is based on a temperature change in the mobile object;
a processor configured to:
detect, based on a second sensor value of the plurality of sensor values, a movement state of the mobile object;
detect first cartographic information at a current location of the mobile object, wherein the first cartographic information includes:
information associated with the temperature change in the mobile object, and
information associated with the movement state, of the mobile object, independent of an operation of the mobile object;
determine that the mobile object is in a static state based on each of the movement state of the mobile object and the first cartographic information;
reset the offset value based on the determination that the mobile object is in the static state; and
control the autonomous movement of the mobile object based on the reset offset value;
the mobile object control device further comprising a memory configured to store map information that includes a prohibition point where the mobile object control device is prohibited to determine that the mobile object is in the static state,
the processor further configured to:
detect that the mobile object is in a stopped state;
detect, based on the map information, second cartographic information indicating that the current location of the mobile object is the prohibition point;
determine that the mobile object is in a mobbing state based on each of:
the detection that the mobile object is in the stopped state, and
the second cartographic information;
detect third cartographic information indicating a point, wherein the point is different from the prohibition point;
determine that the mobile object is in the moving state based on the third cartographic information; and
perform, based on each of the third cartographic information and the determination that the mobile object is in the moving state, an update process of registration of the point as the prohibition point in the map information.

2. The mobile object control device according to claim 1, wherein the processor is further configured to:
detect that the mobile object is in a stopped state;
determine object information indicating presence of an object, wherein the object applies external force to the mobile object; and
determine that the mobile object is in a moving state based on each of:
detection that the mobile object is in the stopped state, and
the determined object information.

3. The mobile object control device according to claim 1, wherein the processor is further configured to:
detect that the mobile object is in a stopped state;
detect fourth cartographic information indicating a point where external force is applied to the mobile object; and
determine that the mobile object is in a moving state based on each of:
the detection that the mobile object is in the stopped state, and
the fourth cartographic information.

4. The mobile object control device according to claim 1, wherein the processor is further configured to:
detect that the mobile object is in a stopped state;
detect operation information indicating that a movable portion of the mobile object is in the operation; and
determine that the mobile object is in a moving based on each of:
in a case where the first detection unit detects that the mobile object is in the stopped state, and
the operation information.

5. The mobile object control device according to claim 1, wherein
the sensor includes a gyroscope sensor, and
the first sensor value is associated with the gyroscope sensor.

6. The mobile object control device according to claim 5, wherein the processor is further configured to:
determine, within a determined time, that the temperature change is one of equal to or larger than a threshold; and correct the offset value based on each of:
the determination that the mobile object is in the static state, and
the determination that the temperature change is one of equal to or larger than the threshold.

7. The mobile object control device according to claim 6, wherein the processor is further configured to correct the offset value after a determined period elapses from a time of the temperature change.

8. The mobile object control device according to claim 1, wherein the processor is further configured to:
detect load information related to a load on the mobile object; and
determine that the mobile object is in a moving state based on the load information.

9. The mobile object control device according to claim 1, wherein the processor is further configured to:
detect at least one of:
object information indicating presence of an object in a periphery of the mobile object, or
operation information of a movable portion of the mobile object; and
determine that the mobile object is in the static state based on the at least one of the object information and the operation information.

10. A mobile object control method comprising:
measuring, by a sensor, a plurality of sensor values associated with a mobile object, wherein
the sensor is mounted on the mobile object that moves autonomously,
a first sensor value of the plurality of sensor values includes an offset value, and
the offset value is based on a temperature change in the mobile object;
detecting, by a processor, a movement state of the mobile object based on a second sensor value of the plurality of sensor values;
detecting, by the processor, cartographic information at a current location of the mobile object, wherein the cartographic information includes:
information associated with the temperature change in the mobile object, and
information associated with the movement state, of the mobile object, independent of an operation of the mobile object;
determining, by the processor, that the mobile object is in a static state based on each of the movement state of the mobile object and the cartographic information;
detecting, by the processor, that the mobile object is in a stopped state;
detecting, by the processor, based on map information stored in a memory that includes a prohibition point where a mobile object control device is prohibited to determine that the mobile object is in the static state, second cartographic information indicating that the current location of the mobile object is the prohibition point;
determining, by the processor, that the mobile object is in a moving state based on each of:
the detection that the mobile object is in the stopped state, and
the second cartographic information;
detecting, by the processor, third cartographic information indicating a point, wherein the point is different from the prohibition point;
determining, by the processor, that the mobile object is in the moving state based on the third cartographic information;
performing, based on each of the third cartographic information and the determination that the mobile object is in the moving state, an update processes of registration of the point as the prohibition point in the map information;
resetting, by the processor, the offset value based on the determination that the mobile object is in the static state; and
controlling, by the processor, the autonomous movement of the mobile object based on the reset offset value.

* * * * *